United States Patent
Powell

(10) Patent No.: US 9,604,189 B2
(45) Date of Patent: Mar. 28, 2017

(54) METHODS AND SYSTEMS FOR PROMOTING HYDROGEN GAS DISTRIBUTION WITHIN CELLULOSIC BIOMASS SOLIDS DURING HYDROTHERMAL DIGESTION

(71) Applicant: Shell Oil Company, Houston, TX (US)

(72) Inventor: Joseph Broun Powell, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 586 days.

(21) Appl. No.: 14/108,933

(22) Filed: Dec. 17, 2013

(65) Prior Publication Data

US 2014/0174432 A1     Jun. 26, 2014

Related U.S. Application Data

(60) Provisional application No. 61/740,039, filed on Dec. 20, 2012.

(51) Int. Cl.
*B01J 8/22* (2006.01)
*C10G 3/00* (2006.01)

(52) U.S. Cl.
CPC ............ *B01J 8/228* (2013.01); *C10G 3/50* (2013.01); *C10G 3/56* (2013.01);
(Continued)

(58) Field of Classification Search
CPC ............ B01J 8/228; B01J 2208/00884; B01J 2208/0092; C10G 3/50; C10G 3/56; C10G 2300/1014; Y02P 30/20
See application file for complete search history.

(56) References Cited

U.S. PATENT DOCUMENTS

| | | |
|---|---|---|
| 6,030,915 A | 2/2000 | de Boer |
| 6,127,229 A | 10/2000 | Chu et al. |

(Continued)

FOREIGN PATENT DOCUMENTS

| | | |
|---|---|---|
| CN | 102584750 | 7/2012 |
| DE | 402509 | 9/1924 |

(Continued)

OTHER PUBLICATIONS

Written Opinion of the International Searching Authority of PCT/US2013/076403 dated Apr. 16, 2014.

(Continued)

*Primary Examiner* — David A Reifsnyder

(57) ABSTRACT

Methods and systems for promoting hydrogen gas distribution within cellulosic biomass solids during hydrothermal digestion. On exemplary method can comprise: heating a first portion of cellulosic biomass solids being contacted by a continuous liquid phase and a second portion of cellulosic biomass solids being contacted by a continuous gas phase in the presence of an upwardly directed flow of molecular hydrogen and a slurry catalyst capable of activating molecular hydrogen in the continuous liquid phase; conveying at least a portion of the continuous liquid phase and at least a portion of the slurry catalyst to a location within the continuous gas phase above at least a portion of the cellulosic biomass solids; and after conveying the continuous liquid phase and the slurry catalyst, releasing them such that they contact the second portion of cellulosic biomass solids.

16 Claims, 2 Drawing Sheets

(52) U.S. Cl.
CPC ............... *B01J 2208/0092* (2013.01); *B01J 2208/00752* (2013.01); *B01J 2208/00884* (2013.01); *C10G 2300/1014* (2013.01); *C10G 2400/04* (2013.01); *Y02P 30/20* (2015.11)

(56) References Cited

U.S. PATENT DOCUMENTS

| | | |
|---|---|---|
| 8,022,260 B2 | 9/2011 | O'Connor |
| 8,262,905 B2 | 9/2012 | Gabrielov et al. |
| 2010/0236988 A1 | 9/2010 | Gabrielov et al. |
| 2011/0219670 A1 | 9/2011 | Berger et al. |
| 2012/0317872 A1 | 12/2012 | Powell et al. |

FOREIGN PATENT DOCUMENTS

| | | | | |
|---|---|---|---|---|
| NL | WO 2014100339 A1 | * | 6/2014 | ............ B01J 8/228 |
| WO | 0194281 | | 12/2001 | |
| WO | 2011141546 | | 11/2011 | |
| WO | 2014004844 | | 1/2014 | |

OTHER PUBLICATIONS

State Intellectual Property Office of the People's Republic of China, Notification of the First Office Action, Mar. 9, 2016 for Application No. 201380070992.9.

* cited by examiner

METHODS AND SYSTEMS FOR PROMOTING HYDROGEN GAS DISTRIBUTION WITHIN CELLULOSIC BIOMASS SOLIDS DURING HYDROTHERMAL DIGESTION

CROSS-REFERENCE TO RELATED APPLICATIONS

This non-provisional application claims the benefit of U.S. Provisional Application No. 61/740,039, filed on Dec. 20, 2012, the disclosure of which is incorporated by reference herein in its entirety.

TECHNICAL FIELD

The present disclosure generally relates to digestion of cellulosic biomass solids, and, more specifically, to methods and systems for promoting effective hydrogen gas distribution within cellulosic biomass solids during hydrothermal digestion.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, including biomass. Cellulosic biomass may be particularly suitable in this regard due to the versatility of the abundant carbohydrates found therein in various forms. As used herein, the term "cellulosic biomass" refers to a living or formerly living biological material that contains cellulose. The lignocellulosic material found in the cell walls of higher plants is one of the world's largest sources of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter.

Significant attention has been placed on developing fossil fuel alternatives derived from renewable resources. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have typically produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass prior to pulp formation. Although digestion processes used in connection with forming fuel blends and other materials may likewise remove lignin prior to digestion, these extra process steps may impact the energy efficiency and cost of the biomass conversion process. The presence of lignin during high-conversion cellulosic biomass digestion may be particularly problematic.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150° C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, diols, monohydric alcohols, and any combination thereof, some of which may also include a residual carbonyl functionality (e.g., an aldehyde or a ketone). Such reaction products are more thermally stable than soluble carbohydrates and may be readily transformable into fuel blends and other materials through conducting one or more downstream reforming reactions. In addition, the foregoing types of reaction products are good solvents in which a hydrothermal digestion may be performed, thereby promoting solubilization of soluble carbohydrates as their reaction products during hydrothermal digestion.

A particularly effective manner in which soluble carbohydrates may be formed and converted into more stable compounds is through conducting the hydrothermal digestion of cellulosic biomass in the presence of molecular hydrogen and a slurry catalyst capable of activating the molecular hydrogen (also referred to herein as a "hydrogen-activating catalyst"). That is, in such approaches (termed "in situ catalytic reduction reaction processes" herein), the hydrothermal digestion of cellulosic biomass and the catalytic reduction of soluble carbohydrates produced therefrom may take place in the same vessel. As used herein, the term "slurry catalyst" will refer to a catalyst comprising fluidly mobile catalyst particles that can be at least partially suspended in a fluid phase via gas flow, liquid flow, mechanical agitation, or any combination thereof. If the slurry catalyst is sufficiently well distributed in the cellulosic biomass, soluble carbohydrates formed during hydrothermal digestion may be intercepted and converted into more stable compounds before they have had an opportunity to significantly degrade, even under thermal conditions that otherwise promote their degradation. Without adequate catalyst distribution being realized, soluble carbohydrates produced by in situ catalytic reduction reaction processes may still degrade before they have had an opportunity to encounter a catalytic site and undergo a stabilizing reaction. In situ catalytic reduction reaction processes may also be particularly suitable from an energy efficiency standpoint, since hydrothermal digestion of cellulosic biomass is an endothermic process, whereas catalytic reduction reactions are exothermic. Thus, the excess heat generated by the in situ catalytic reduction reaction(s) may be utilized to drive the hydrothermal digestion with little opportunity for heat transfer loss to occur, thereby lowering the amount of additional heat energy input needed to conduct the digestion.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, valving, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other substances may be present within cellulosic biomass that can be especially problematic to deal with in an energy- and cost-efficient manner. Sulfur- and/or nitrogen-containing amino acids or other catalyst poisons may be present in cellulosic biomass. If not removed, these catalyst poisons can impact the catalytic reduction reaction(s) used to stabilize soluble carbohydrates, thereby resulting in process downtime for catalyst regeneration and/or replacement and reducing the overall energy efficiency when restarting the process. This issue is particularly significant for in situ catalytic reduction reaction processes, where there is minimal opportunity to address the presence of catalyst poisons, at least without significantly increasing process complexity and cost. As mentioned above, lignin can also be particularly problematic to deal with if it is not removed prior to beginning digestion. During cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY

The present disclosure generally relates to digestion of cellulosic biomass solids, and, more specifically, to methods and systems for promoting effective hydrogen gas distribution within cellulosic biomass solids during hydrothermal digestion for in situ stabilization of soluble carbohydrates.

In some embodiments, the present disclosure provides methods comprising: providing a first portion of cellulosic biomass solids being contacted by a continuous liquid phase and a second portion of cellulosic biomass solids being contacted by a continuous gas phase, the continuous liquid phase and the continuous gas phase interfacially contacting one another; wherein a slurry catalyst capable of activating molecular hydrogen is present in the continuous liquid phase; supplying an upwardly directed flow of molecular hydrogen through the cellulosic biomass solids; heating the cellulosic biomass solids and the continuous liquid phase in the presence of the molecular hydrogen, thereby forming an alcoholic component derived from the cellulosic biomass solids; conveying at least a portion of the continuous liquid phase and at least a portion of the slurry catalyst to a location within the continuous gas phase that is above at least a portion of the cellulosic biomass solids; and after conveying the continuous liquid phase and the slurry catalyst, releasing them such that they contact the second portion of cellulosic biomass solids in the continuous gas phase.

In one embodiment, once released, the continuous liquid phase and the slurry catalyst migrate downward through the second portion of cellulosic biomass solids as a discontinuous phase within the continuous gas phase. In one embodiment, the continuous liquid phase comprises an organic solvent and water. In another embodiment, the continuous liquid phase comprises one or more liquid phases. In one embodiment, the one or more liquid phases comprises a phenolics liquid phase comprising lignin or a product formed therefrom, an aqueous phase comprising the alcoholic component, a light organics phase, or any combination thereof. In one embodiment, the phenolics liquid phase, the aqueous phase, the light organics phase, or any combination thereof is conveyed to the location within the continuous gas phase. In one embodiment, the phenolics liquid phase is conveyed to the location within the continuous gas phase. In one embodiment, the aqueous phase is conveyed to the location within the continuous gas phase.

In one embodiment, the method further comprises adding slurry catalyst to the portion of the continuous liquid phase being conveyed to the location within the continuous gas phase. In one embodiment, the alcoholic component is formed by a catalytic reduction reaction of soluble carbohydrates, the soluble carbohydrates being derived from the cellulosic biomass solids. In another embodiment, at least a portion of the slurry catalyst in the continuous liquid phase is upwardly conveyed into at least a portion of the first portion of cellulosic biomass solids by the upwardly directed flow of molecular hydrogen. In one embodiment, the slurry catalyst comprises a poison-tolerant catalyst. In one embodiment, the poison-tolerant catalyst comprises a sulfided catalyst.

In one embodiment, the method further comprises supplying an upwardly directed liquid stream into the continuous liquid phase. In one embodiment, supplying an upwardly directed liquid stream into the continuous liquid phase comprises circulating the continuous liquid phase through the first portion of cellulosic biomass solids in an upwardly directed manner.

In one embodiment, at least a portion of the cellulosic biomass solids reside on a porous retention structure that is configured to allow the upwardly directed flow of molecular hydrogen to pass therethrough. In one embodiment, at least a portion of the cellulosic biomass solids accumulate below the porous retention structure in the continuous liquid phase.

In one embodiment, after being released, at least a portion of the continuous liquid phase and the slurry catalyst adheres to the cellulosic biomass solids. In one embodiment, the first portion of cellulosic biomass solids and the second portion of cellulosic biomass solids are located in a hydrothermal digestion unit, the hydrothermal digestion unit comprising a fluid conduit external thereto that is configured to convey the continuous liquid phase from a lower portion of the hydrothermal digestion unit to an upper portion of the hydrothermal digestion, where the continuous gas phase is located. In one embodiment, the method further comprises performing a condensation reaction on the alcoholic component or a product derived therefrom.

In some embodiments, the present disclosure provides methods comprising: providing cellulosic biomass solids in a hydrothermal digestion unit, a first portion of the cellulosic biomass solids being contacted by a continuous liquid phase and a second portion of the cellulosic biomass solids being contacted by a continuous gas phase; wherein a slurry catalyst capable of activating molecular hydrogen is present in the continuous liquid phase; supplying an upwardly directed flow of molecular hydrogen through the cellulosic biomass solids; heating the cellulosic biomass solids and the continuous liquid phase in the presence of the molecular hydrogen, thereby forming an alcoholic component derived from the cellulosic biomass solids; conveying at least a portion of the continuous liquid phase and at least a portion of the slurry catalyst through a fluid conduit external to the hydrothermal digestion unit to a location within the continuous gas phase that is above at least a portion of the cellulosic biomass solids; and after conveying the continuous liquid phase and the slurry catalyst, releasing them such that they migrate downward through the second portion of cellulosic biomass solids as a discontinuous phase within the continuous gas phase.

In one embodiment, the continuous liquid phase comprises an organic solvent and water. In another embodiment, the continuous liquid phase comprises one or more liquid phases. In one embodiment, the one or more liquid phases comprises a phenolics liquid phase comprising lignin or a product formed therefrom, an aqueous phase comprising the alcoholic component, a light organics phase, or any combination thereof. In one embodiment, the phenolics liquid phase, the aqueous phase, the light organics phase, or any combination thereof is conveyed to the location within the continuous gas phase. In one embodiment, the phenolics liquid phase is conveyed to the location within the continuous gas phase. In another embodiment, the aqueous phase is conveyed to the location within the continuous gas phase.

In one embodiment, the method further comprises adding slurry catalyst to the portion of the continuous liquid phase being conveyed to the location within the continuous gas phase. In one embodiment, the alcoholic component is formed by a catalytic reduction reaction of soluble carbohydrates, the soluble carbohydrates being derived from the cellulosic biomass solids. In one embodiment, at least a portion of the slurry catalyst in the continuous liquid phase is upwardly conveyed into at least a portion of the first portion of the cellulosic biomass solids by the upwardly directed flow of molecular hydrogen.

In one embodiment, the method further comprises supplying an upwardly directed liquid stream into the continuous liquid phase. In one embodiment, supplying an upwardly directed liquid stream into the continuous liquid phase comprises circulating the continuous liquid phase through the first portion of cellulosic biomass solids in an upwardly directed manner. In one embodiment, at least a portion of the cellulosic biomass solids reside on a porous retention structure within the hydrothermal digestion unit, the porous retention structure being configured to allow the upwardly directed flow of molecular hydrogen to pass therethrough. In one embodiment, at least a portion of the cellulosic biomass solids accumulate below the porous retention structure in the continuous liquid phase. In one embodiment, the slurry catalyst comprises a poison-tolerant catalyst. In one embodiment, the poison-tolerant catalyst comprises a sulfided catalyst. In one embodiment, the method further comprises performing a condensation reaction on the alcoholic component or a product derived therefrom.

In some embodiments, the present disclosure provides biomass conversion systems comprising: a hydrothermal digestion unit having a first zone and a second zone, the first zone being located below the second zone; wherein the first zone is configured to contain a continuous liquid phase and the second zone is configured to contain a continuous gas phase; wherein the continuous liquid phase contains a slurry catalyst therein; a fluid conduit external to the hydrothermal digestion unit configured to convey the continuous liquid phase from the first zone to the continuous gas phase in the second zone; and an inlet configured to provide upwardly directed gas flow in the first zone.

In one embodiment, the biomass conversion system further comprises a porous retention structure within the first zone, the porous retention structure being configured to allow the upwardly directed gas flow to pass therethrough. In another embodiment, the biomass conversion system further comprises a liquids removal line connected to the first zone; and a reactor housing a condensation catalyst in fluid communication with the liquids removal line. In one embodiment, the biomass conversion system further comprises a liquid phase separation unit in fluid communication with the liquids removal line, the liquid phase separation unit being located between the hydrothermal digestion unit and the reactor housing the condensation catalyst.

The features and advantages of the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
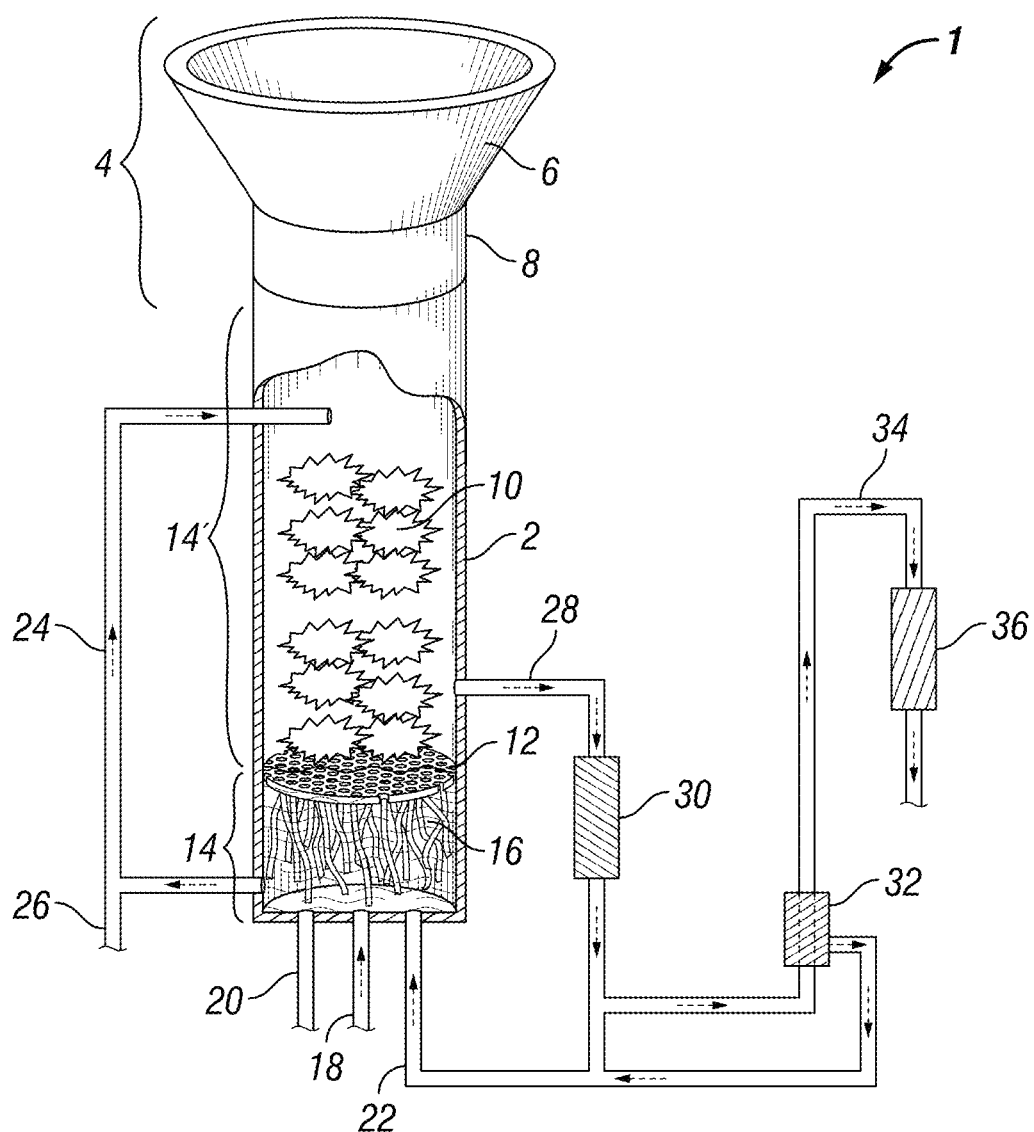
FIGS. 1 and 2 show schematic depictions of an illustrative biomass conversion system in which cellulosic biomass solids may be digested in the presence of a continuous liquid phase and a continuous gas phase that are interfacial to one another.

The present disclosure generally relates to digestion of cellulosic biomass solids, and, more specifically, to methods and systems for promoting effective hydrogen gas distribution within cellulosic biomass solids during hydrothermal digestion for in situ stabilization of soluble carbohydrates.

In the embodiments described herein, the digestion rate of cellulosic biomass solids may be accelerated in the presence of a liquid phase containing a digestion solvent. In some instances, the liquid phase may be maintained at elevated pressures that keep the digestion solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures, as discussed above. As further discussed above, one approach for addressing the degradation of soluble carbohydrates during hydrothermal digestion is to conduct an in situ catalytic reduction reaction process so as to convert the soluble carbohydrates into more stable compounds as soon as possible after their formation.

Although digesting cellulosic biomass solids by an in situ catalytic reduction reaction process may be particularly suitable for at least the reasons noted above, successfully executing such a coupled approach may be problematic in other aspects, especially when all of the digesting cellulosic biomass solids are in contact with a continuous liquid phase, which may comprise multiple liquid phases. One significant issue that may be encountered is that of adequate catalyst distribution within the digesting cellulosic biomass solids, since insufficient catalyst distribution can result in poor stabilization of soluble carbohydrates. Although a catalyst might be pre-mixed or co-blended with cellulosic biomass solids and then subjected to an in situ catalytic reduction reaction process, these solutions may still produce an inadequate catalyst distribution and present significant engineering challenges that markedly increase process complexity and operational costs. In contrast, the present inventor discovered a relatively simple and low cost engineering solution whereby a slurry catalyst may be at least partially distributed within cellulosic biomass solids using fluid flow to convey the slurry catalyst particulates into the interstitial spaces within a charge of cellulosic biomass solids. Although the slurry catalyst may be conveyed into the cellulosic biomass solids using fluid flow from any direction, the present inventor considers it most effective to have at least a portion of the slurry catalyst be conveyed by upwardly directed fluid flow, or at least that upwardly directed fluid flow be present, since such fluid flow may promote expansion of the cellulosic biomass solids and disfavor gravity-induced compaction that occurs during their addition and digestion. In addition, when upwardly directed fluid flow is present, there may be a reduced need to utilize mechanical stirring or like mechanical agitation techniques that might otherwise be needed to obtain an adequate catalyst distribution in the cellulosic biomass solids.

Suitable techniques for using fluid flow to distribute a slurry catalyst within cellulosic biomass solids wholly in contact with a continuous liquid phase are described in commonly owned U.S. Patent Applications 61/665,727 and 61/665,627, issued as U.S. Pat. No. 9,174,898 and published as US20140005444, respectively, incorporated herein by reference in its entirety. As described therein, cellulosic biomass solids may have at least some innate propensity for retaining a slurry catalyst being conveyed by fluid flow, and at least a portion of the cellulosic biomass solids may be sized to better promote such retention. In addition, using fluid flow, particularly upwardly directed fluid flow, to force a slurry catalyst to actively circulate through a charge of digesting cellulosic biomass solids in contact with a continuous liquid phase may ensure an adequate slurry catalyst distribution as well as advantageously reduce thermal gradients that may occur during hydrothermal digestion. As a further advantage, active circulation of the slurry catalyst may address the problem created by the production of cellulosic biomass fines, since they may be co-circulated with the slurry catalyst for continued digestion to take place.

In addition to the difficulties associated with distributing a slurry catalyst within cellulosic biomass solids, the present inventor discovered that effective distribution of molecular hydrogen can also be problematic. As with a poorly distributed slurry catalyst, inadequate distribution of molecular hydrogen can likewise result in poor stabilization of soluble carbohydrates during in situ catalytic reduction reaction processes. As described above, an upwardly directed fluid flow can at least partially fluidize a slurry catalyst and/or a least partially expand a charge of cellulosic biomass solids during an in situ catalytic reduction reaction process. One way in which an upwardly directed fluid flow can be provided to the cellulosic biomass solids is via an upwardly directed flow of molecular hydrogen. For example, an inflow of molecular hydrogen may produce bubbles that percolate upward through the cellulosic biomass solids to provide at least a portion of the upwardly directed fluid flow. Although this approach can oftentimes be effective for conveying a slurry catalyst into cellulosic biomass solids in contact with a continuous liquid phase, it may not always produce an adequate distribution of molecular hydrogen throughout the entirety of the cellulosic biomass solids, as discussed hereinafter. Locations in which there is an inadequate distribution of molecular hydrogen may still experience poor stabilization of soluble carbohydrates, even if an effective slurry catalyst distribution has taken place.

Effective distribution of molecular hydrogen within the entirety of a charge of cellulosic biomass solids in contact with a continuous liquid phase can be dependent upon maintaining the molecular hydrogen at a bubble size small enough for the bubbles to become distributed within the interstitial space throughout the cellulosic biomass solids. If a sufficient number of small hydrogen bubbles coalesce into larger bubbles, an increasingly poor distribution of molecular hydrogen within the cellulosic biomass solids may be realized, particularly at locations farther removed from the location(s) at which the molecular hydrogen is introduced to the cellulosic biomass solids. As a result, poor stabilization of soluble carbohydrates can occur in the locations where excessive hydrogen bubble coalescence has occurred, particularly in the upper portions of a charge of cellulosic biomass solids. Factors leading to hydrogen bubble coalescence may include, for example, surface tension effects as the bubbles rise in the cellulosic biomass solids, particularly in the presence of aqueous solvents. Liberation of natural surfactants from the cellulosic biomass solids during hydrothermal digestion may also play a role in hydrogen bubble coalescence.

The present inventor recognized that for an effective stabilization of soluble carbohydrates to take place during an in situ catalytic reduction reaction process, a good distribution of both the slurry catalyst and molecular hydrogen would have to be realized over the entire height of a charge of cellulosic biomass solids. More particularly, the present inventor recognized that sufficiently small bubbles of molecular hydrogen would need to be maintained throughout the entirety of a continuous liquid phase in contact with the cellulosic biomass solids in order for an adequate degree of molecular hydrogen distribution to be realized. As one solution for maintaining small bubbles of molecular hydrogen throughout the entirety of a continuous liquid phase, the present inventor considered introduction of molecular hydrogen at multiple locations along the height of a charge of cellulosic biomass solids, such that small bubbles are present throughout the continuous liquid phase. Such approaches are described in commonly owned U.S. Provisional Patent Application No. 61/740,006, entitled "Methods and Systems for Promoting Hydrogen Gas Distribution Within Cellulosic Biomass Solids During Hydrothermal Digestion," published as US20140174433, incorporated herein by reference in its entirety. However, such approaches may necessitate the use of considerable excesses of hydrogen and may be somewhat complex and costly to engineer.

As an alternative to the foregoing, the present inventor realized that it was not necessary to maintain the entirety of the cellulosic biomass solids in contact with a continuous liquid phase. Specifically, the inventor recognized that by maintaining a first portion of the cellulosic biomass solids in contact with a continuous liquid phase (e.g., a digestion solvent) and a second portion of the cellulosic biomass solids in contact with a continuous gas phase (e.g., excess molecular hydrogen), the continuous liquid phase could be limited in size to reduce the opportunity for hydrogen bubble coalescence to occur. By limiting the opportunity for hydrogen bubble coalescence to occur, an effective distribution of both the slurry catalyst and molecular hydrogen in the continuous liquid phase can be realized. As cellulosic biomass solids in the continuous liquid phase are digested and transformed into soluble carbohydrates, cellulosic biomass solids from the continuous gas phase enter the continuous liquid phase and thereby continue the hydrothermal digestion process therein. Moreover, once the hydrogen bubbles exit the continuous liquid phase, they may add to the continuous gas phase in which the second portion of cellulosic biomass solids is disposed, thereby providing the needed hydrogen distribution to this portion of cellulosic biomass solids as well. Solutions for providing slurry catalyst distribution in the continuous gas phase and maintaining hydrothermal digestion therein are discussed hereinafter.

While the second portion of cellulosic biomass solids maintained in the continuous gas phase may have abundant molecular hydrogen distributed therethrough in the foregoing approach, there is substantially no slurry catalyst present in this phase, since the slurry catalyst remains confined within the continuous liquid phase. Accordingly, ineffective stabilization of soluble carbohydrates may still occur within the continuous gas phase. In order to affect hydrothermal digestion and stabilization of soluble carbohydrates in the continuous gas phase as well, the present inventor recognized that at least a portion of the slurry catalyst could be introduced to the continuous gas phase by conveying at least a portion of the continuous liquid phase thereto. Once conveyed to a location above at least a portion of the cellulosic biomass solids in the continuous gas phase, the conveyed liquid phase and slurry catalyst can be released such that they contact the cellulosic biomass solids located within the continuous gas phase. The continuous liquid phase and slurry catalyst conveyed to the continuous gas phase may then migrate downward through the cellulosic biomass solids as a discontinuous phase within the continuous gas phase. That is, in the foregoing approach, the digestion of cellulosic biomass solids in the continuous gas phase may take place in a trickle bed manner, with slurry catalyst being distributed therein from above. Meanwhile, digestion of cellulosic biomass solids in the continuous liquid phase may occur in a slurry bubble column manner, with slurry catalyst being distributed therein from below. Conducting the hydrothermal digestion of cellulosic biomass solids in the presence of a continuous liquid phase and a continuous gas phase may result in more effective stabilization of soluble carbohydrates than can be realized by contacting the entirety of the cellulosic biomass solids with only a continuous liquid phase digestion medium.

While digesting cellulosic biomass solids by an in situ catalytic reduction reaction process in the presence of a slurry catalyst and an aqueous phase digestion solvent, where the cellulosic biomass solids were supplied on an ongoing basis, the present inventor discovered that lignin from the cellulosic biomass solids eventually separated as a phenolics liquid phase that was neither fully dissolved nor fully precipitated, but instead formed as a discrete liquid phase that was highly viscous and hydrophobic. The slurry catalyst was well wetted by the phenolics liquid phase and accumulated therein over time, thereby making the slurry catalyst less readily distributable in the cellulosic biomass solids. In many instances, the phenolics liquid phase was below the aqueous phase, which also contained an alcoholic component derived from the cellulosic biomass solids via a catalytic reduction reaction of soluble carbohydrates. Depending on the ratio of water and organic solvent in the digestion solvent, rates of fluid flow, catalyst identity, reaction times and temperatures, and the like, a light organics phase was also sometimes observed, typically above the aqueous phase, where the components of the light organics phase were also derived, at least in part, from the cellulosic materials in the biomass. Components present in the light organics phase included, for example, the alcoholic component derived from the cellulosic biomass solids, including $C_4$ or greater alcohols, and self-condensation products, such as those obtained by the acid-catalyzed Aldol reaction.

Distribution of the slurry catalyst in the continuous gas phase by conveying the continuous liquid phase thereto may take place using various components of the continuous liquid phase, including any combination of those described above. The phenolics liquid phase alone may be conveyed from the continuous liquid phase to the continuous gas phase, or a mixture of the phenolics liquid phase and one or more additional components of the continuous liquid phase may be conveyed to the continuous gas phase. In the alternative, the aqueous phase and/or the light organics phase may be conveyed from the continuous liquid phase to the continuous gas phase. If the slurry catalyst is not present in the portion of the continuous liquid phase being conveyed to the continuous gas phase, or if insufficient slurry catalyst is present, additional slurry catalyst may be added to the conveyed continuous liquid phase before it is introduced to the continuous gas phase and released for downward migration through the cellulosic biomass solids. For example, if the aqueous phase and/or the light organics phase is conveyed to the continuous gas phase, additional slurry catalyst may be added thereto to make up for slurry catalyst accumulated in the phenolics liquid phase.

In addition to addressing the distribution of slurry catalyst in the continuous gas phase, downwardly migrating slurry catalyst in the foregoing manner may advantageously address difficulties associated with re-distributing slurry catalyst that has accumulated in the phenolics liquid phase. Specifically, as the slurry catalyst migrates downward through the continuous gas phase, it may eventually re-enter the continuous liquid phase and become distributed therein. Distributing the slurry catalyst in the continuous liquid phase in this manner may produce a more effective catalyst distribution than can be realized using upwardly directed fluid flow alone due to catalyst wetting by the phenolics liquid phase.

Unless otherwise specified, it is to be understood that use of the terms "biomass" or "cellulosic biomass" in the description herein refers to "cellulosic biomass solids." Solids may be in any size, shape, or form. The cellulosic biomass solids may be natively present in any of these solid sizes, shapes, or forms, or they may be further processed prior to hydrothermal digestion. In some embodiments, the cellulosic biomass solids may be chopped, ground, shredded, pulverized, and the like to produce a desired size prior to hydrothermal digestion. In some or other embodiments, the cellulosic biomass solids may be washed (e.g., with water, an acid, a base, combinations thereof, and the like) prior to hydrothermal digestion taking place.

In practicing the present embodiments, any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. Once soluble carbohydrates have been produced through hydrothermal digestion according to the embodiments described herein, the soluble carbohydrates may be transformed into a more stable reaction product comprising a monohydric alcohol, a glycol, a triol, or any combination thereof, at least some of which may also contain a carbonyl functionality. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof.

As used herein, the term "phenolics liquid phase" will refer to a fluid phase comprising liquefied lignin. In some embodiments, the phenolics liquid phase may be more dense than water, but it may also be less dense than water depending on lignin concentrations and the presence of other components, for example.

As used herein, the term "light organics phase" will refer to a fluid phase that is typically less dense than water and comprises an organic compound. The organic compound may include at least a portion of an alcoholic component formed via catalytic reduction of soluble carbohydrates, which may include $C_4$ or greater alcohols and self-condensation products thereof.

As used herein, the term "hydrothermal digestion unit" refers to a vessel in which the digestion of cellulosic biomass solids is conducted.

In some embodiments, methods described herein can comprise: providing a first portion of cellulosic biomass solids being contacted by a continuous liquid phase and a second portion of cellulosic biomass solids being contacted by a continuous gas phase, the continuous liquid phase and the continuous gas phase interfacially contacting one another; wherein a slurry catalyst capable of activating molecular hydrogen is present in the continuous liquid phase; supplying an upwardly directed flow of molecular hydrogen through the cellulosic biomass solids; heating the cellulosic biomass solids and the continuous liquid phase in the presence of the molecular hydrogen, thereby forming an alcoholic component derived from the cellulosic biomass solids; conveying at least a portion of the continuous liquid phase and at least a portion of the slurry catalyst to a location within the continuous gas phase that is above at least a portion of the cellulosic biomass solids; and after conveying the continuous liquid phase and the slurry catalyst, releasing them such that they contact the second portion of cellulosic biomass solids in the continuous gas phase.

As discussed above, by conveying at least a portion of the continuous liquid phase and at least a portion of the slurry catalyst to a continuous gas phase that interfacially contacts the continuous liquid phase, digestion of the cellulosic biomass solids in each phase may take place by complementary motifs. Specifically, the first portion of cellulosic biomass solids in the continuous liquid phase may undergo hydrothermal digestion in a slurry bubble column motif, with catalyst distribution being affected by the upwardly directed flow of molecular hydrogen. The second portion of the cellulosic biomass solids in the continuous gas phase, in contrast, may undergo hydrothermal digestion in a trickle bed motif, with the conveyed continuous liquid phase and slurry catalyst migrating downward through the second portion of cellulosic biomass solids in the continuous gas phase and eventually recombining with the continuous liquid phase. The continuous gas phase may comprise the hydrogen supplied as upwardly directed bubbles to the continuous liquid phase. Thus, even if the upwardly directed flow of molecular hydrogen produces bubbles that eventually coalesce and become too large for effective distribution in the continuous liquid phase, the hydrogen may still promote stabilization of the soluble carbohydrates in the continuous gas phase. The size of the continuous liquid phase may be adjusted to compensate for the degree of hydrogen bubble coalescence, such that the hydrogen remains distributed in the first portion of cellulosic biomass solids in the continuous liquid phase and effective stabilization of soluble carbohydrates can take place therein.

In some alternative embodiments, the conveyed continuous liquid phase and slurry catalyst may adhere to the cellulosic biomass solids, instead of migrating downward as a discontinuous phase within the continuous gas phase. For example, if the slurry catalyst is conveyed to the continuous gas phase within a phenolics liquid phase, the phenolics liquid phase and slurry catalyst may adhere to the cellulosic biomass solids in the continuous gas phase, such that downward migration of the slurry catalyst does not immediately occur. In such embodiments, the slurry catalyst may still migrate downward as cellulosic biomass solids in the continuous liquid phase are digested and lose structural integrity, at which point the cellulosic biomass solids in the continuous gas phase may sink into the continuous liquid phase, carrying slurry catalyst thereto and continuing the hydrothermal digestion process in the continuous liquid phase.

In some embodiments, the first portion of cellulosic biomass solids and the second portion of cellulosic biomass solids may be located in a hydrothermal digestion unit while being converted into the alcoholic component. Accordingly, in the embodiments described herein, the conversion of cellulosic biomass solids into an alcoholic component in the presence of a continuous liquid phase and a continuous gas phase may take place via an in situ catalytic reduction reaction process. In some embodiments, the hydrothermal digestion unit may comprise a fluid conduit external to the hydrothermal digestion unit that is configured to convey the continuous liquid phase from a lower portion of the hydrothermal digestion unit to an upper portion of the hydrothermal digestion unit, where the continuous gas phase is located.

In some embodiments, methods described herein can comprise: providing cellulosic biomass solids in a hydrothermal digestion unit, a first portion of the cellulosic biomass solids being contacted by a continuous liquid phase and a second portion of the cellulosic biomass solids being contacted by a continuous gas phase; wherein a slurry catalyst capable of activating molecular hydrogen is present in the continuous liquid phase; supplying an upwardly directed flow of molecular hydrogen through the cellulosic biomass solids; heating the cellulosic biomass solids and the continuous liquid phase in the presence of the molecular hydrogen, thereby forming an alcoholic component derived from the cellulosic biomass solids; conveying at least a portion of the continuous liquid phase and at least a portion of the slurry catalyst through a fluid conduit external to the hydrothermal digestion unit to a location within the continuous gas phase that is above at least a portion of the cellulosic biomass solids; and after conveying the continuous liquid phase and the slurry catalyst, releasing them such that they migrate downward through the second portion of cellulosic biomass solids as a discontinuous phase within the continuous gas phase.

In various embodiments, the alcoholic component derived from the cellulosic biomass solids may be formed by a catalytic reduction reaction of soluble carbohydrates, where the soluble carbohydrates are derived from the cellulosic biomass solids. As described above, the methods and systems described herein can help promote adequate distribution of the slurry catalyst and the molecular hydrogen throughout the cellulosic biomass solids such that the catalytic reduction reaction can more effectively take place.

In some embodiments, the catalytic reduction reaction used to produce the alcoholic component may take place at a temperature ranging between about 110° C. and about 300° C., or between about 170° C. and about 300° C., or between about 180° C. and about 290° C., or between about 150° C. and about 250° C. The temperature profile of the continuous liquid phase and the continuous gas phase may be the same or different. In some embodiments, the continuous liquid phase and the continuous gas phase may be maintained at substantially the same temperature. In other embodiments, the continuous gas phase may be maintained at a lower temperature than the continuous liquid phase, or in still other embodiments, the continuous gas phase may be maintained at a higher temperature than the continuous liquid phase.

The temperature profile of the continuous gas phase may be regulated by adjusting the rate at which the continuous liquid phase is conveyed thereto, or active thermal maintenance can be performed by applying external heaters or coolers to the continuous gas phase to maintain this phase at a desired temperature.

In some embodiments, the catalytic reduction reaction used to produce the alcoholic component may take place at a pH of the continuous liquid phase ranging between about 7 and about 13, or between about 10 and about 12. In other embodiments, the catalytic reduction reaction may take place under acidic conditions in the continuous liquid phase, such as at a pH of about 5 to about 7. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In various embodiments, the continuous liquid phase may comprise an organic solvent and water. Although any organic solvent that is at least partially miscible with water may be used as a digestion solvent in the continuous liquid phase, particularly suitable organic solvents are those that can be directly converted into fuel blends and other materials without being separated from the alcoholic component being produced from the cellulosic biomass solids. That is, particularly suitable organic solvents are those that may be co-processed along with the alcoholic component during downstream reforming reactions into fuel blends and other materials. Suitable organic solvents in this regard may include, for example, ethanol, ethylene glycol, propylene glycol, glycerol, and any combination thereof. In some embodiments, the digestion solvent may comprise a component derived from cellulosic biomass solids.

In some embodiments, the continuous liquid phase may further comprise a small amount of a monohydric alcohol. The presence of at least some monohydric alcohols in the continuous liquid phase may desirably enhance the hydrothermal digestion and/or the catalytic reduction reactions being conducted therein. For example, inclusion of about 1% to about 5% by weight monohydric alcohols in the continuous liquid phase may desirably maintain catalyst activity due to a surface cleaning effect. Monohydric alcohols present in the continuous liquid phase may arise from any source. In some embodiments, the monohydric alcohols may be formed via the in situ catalytic reduction reaction process. In some or other embodiments, the monohydric alcohols may be formed during further chemical transformations of the initially formed alcoholic component. In still other embodiments, the monohydric alcohols may be sourced from an external feed that is in flow communication with the cellulosic biomass solids.

In some embodiments, the continuous liquid phase may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the continuous liquid phase may comprise about 90% or less water by weight. In other embodiments, the continuous liquid phase may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

As described above, in some embodiments, the continuous liquid phase may comprise one or more liquid phases. The liquid phases may be immiscible with one another, or they may be at least partially miscible with one another. In some embodiments, the one or more liquid phases may comprise a phenolics liquid phase comprising lignin or a product formed therefrom, an aqueous phase comprising the alcoholic component, a light organics phase, or any combination thereof. The alcoholic component being produced from the cellulosic biomass solids may be partitioned between the one or more liquid phases, or the alcoholic component may be located substantially in a single liquid phase. For example, the alcoholic component being produced from the cellulosic biomass solids may be located predominantly in an aqueous phase, although minor amounts of the alcoholic component may be partitioned to the phenolics liquid phase or a light organics phase. In various embodiments, the slurry catalyst may accumulate in the phenolics liquid phase as it forms.

Any of the one or more liquid phases comprising the continuous liquid phase may be conveyed to the continuous gas phase. In some embodiments, the phenolics liquid phase, the aqueous phase, the light organics phase, or any combination thereof may be conveyed to the location in the continuous gas phase. In some embodiments, the phenolics liquid phase may be conveyed to the location in the continuous gas phase. In other embodiments, the aqueous phase may be conveyed to the location within the continuous gas phase. In still other embodiments, the light organics phase may be conveyed to the location within the continuous gas phase.

Depending on which component or phase of the continuous liquid phase is being conveyed to the continuous gas phase, varying amounts of the slurry catalyst may be conveyed to the continuous gas phase. For example, after the phenolics liquid phase has formed and slurry catalyst has accumulated therein, conveyance of this phase or a mixture of this phase with another liquid phase to the continuous gas phase may supply sufficient slurry catalyst thereto to effectively promote stabilization of soluble carbohydrates during hydrothermal digestion. Depending upon the degree to which the slurry catalyst has accumulated in the phenolics liquid phase, there may also be sufficient slurry catalyst located within the aqueous phase and/or the light organics phase to affect stabilization of soluble carbohydrates by conveying these phases to the continuous gas phase. Optionally, the slurry catalyst being conveyed to the continuous gas phase may be regenerated, if needed, prior to being released in the continuous gas phase.

In some embodiments, the portion of the continuous liquid phase being conveyed to the continuous gas phase may lack sufficient slurry catalyst therein to effectively promote stabilization of soluble carbohydrates in the continuous gas phase. In such embodiments, the methods described herein may further comprise adding slurry catalyst to the portion of the continuous liquid phase being conveyed to the location within the continuous gas phase. For example, if the aqueous phase is being conveyed from the continuous liquid phase to the continuous gas phase, there may be insufficient slurry catalyst therein to effectively promote stabilization of soluble carbohydrates, since catalyst accumulation in the phenolics liquid phase may have occurred. In such cases, it can be desirable to supplement the slurry catalyst being conveyed to the continuous gas phase.

The slurry catalyst being added to the conveyed continuous liquid phase may arise from any source. For example, the slurry catalyst may be added to the conveyed continuous liquid phase from an external source, or the slurry catalyst may be removed from elsewhere in the continuous liquid phase and added to the portion of the continuous liquid phase being conveyed to the continuous gas phase. As a non-limiting example, the slurry catalyst may be recovered from the phenolics liquid phase following deviscosification (e.g., via depolymerization of the lignin therein) and then added to the continuous liquid phase being conveyed to the continuous gas phase.

As described above, the methods set forth herein can comprise supplying an upwardly directed flow of molecular hydrogen through the cellulosic biomass solids. Supplying the upwardly directed flow of molecular hydrogen can comprise introducing the molecular hydrogen into the continuous liquid phase such that a plurality of hydrogen gas bubbles form therein. In some embodiments, the upwardly directed flow of molecular hydrogen may be introduced into the continuous liquid phase below the cellulosic biomass solids (e.g., through the bottom of the hydrothermal digestion unit). In other embodiments, the upwardly directed flow of molecular hydrogen may be introduced directly into the cellulosic biomass solids, rather than from beneath them.

In some embodiments, the upwardly directed flow of molecular hydrogen may upwardly convey at least a portion of the slurry catalyst in the continuous liquid phase into at least a portion of the of cellulosic biomass solids in the continuous liquid phase. That is, in addition to expanding the cellulosic biomass solids and limiting gravity-induced compaction, the upwardly directed flow of molecular hydrogen may fluidize at least a portion of the slurry catalyst and transport the slurry catalyst upward within the continuous liquid phase. Fluidization of the slurry catalyst in this manner may result in distribution of the slurry catalyst in at least a portion of the cellulosic biomass solids in contact with the continuous liquid phase. No particular degree or type of distribution is implied by use of the term "distribution" or its variants. Fluidization of the slurry catalyst in the foregoing manner is to be distinguished from conveyance of the continuous liquid phase to the continuous gas phase and contacting the cellulosic biomass solids from above.

In addition to the upwardly directed flow of molecular hydrogen being supplied to the cellulosic biomass solids, other sources of upwardly directed fluid flow may be present as well. The upwardly directed fluid flow may comprise a liquid stream, a gas stream, or any combination thereof. In various embodiments, the upwardly directed fluid flow may comprise one upwardly directed fluid stream in addition to the upwardly directed flow of molecular hydrogen, or two upwardly directed fluid streams in addition to the upwardly directed flow of molecular hydrogen, or three upwardly directed fluid streams in addition to the upwardly directed flow of molecular hydrogen, or four upwardly directed fluid streams in addition to the upwardly directed flow of molecular hydrogen, or five upwardly directed fluid streams in addition to the upwardly directed flow of molecular hydrogen. The one or more upwardly directed fluid streams may contain the slurry catalyst at its source (e.g., a liquid stream carrying at least a portion of the slurry catalyst), or the upwardly directed fluid stream may lack the slurry catalyst at its source (e.g., a gas stream or a liquid stream devoid of the slurry catalyst).

In some embodiments, an upwardly directed gas stream may be present in addition to the upwardly directed stream of molecular hydrogen. The upwardly directed gas stream may comprise steam, compressed air, or an inert gas such as nitrogen, for example. Combinations of these gases may be used as well. When used, up to about 40% steam may be present in the upwardly directed fluid stream in various embodiments.

In some embodiments, an upwardly directed liquid stream may be present in addition to the upwardly directed stream of molecular hydrogen. In some embodiments, the upwardly directed liquid stream may comprise a makeup flow of the digestion solvent or any component thereof. In some embodiments, the upwardly directed liquid stream may comprise a recirculation flow of the continuous liquid phase. Any liquid phase of the continuous liquid phase may be recirculated in the upwardly directed liquid stream. For example, the phenolics liquid phase, the aqueous phase, the light organics phase, or any combination of these liquid phases may be recirculated to the cellulosic biomass solids as an upwardly directed liquid stream. Slurry catalyst may or may not be present in the recirculation flow, depending on flow rates, the identity of the liquid phase being recirculated, and/or the extent to which the slurry catalyst has accumulated in the phenolics liquid phase, for example. One may choose to apply an upwardly directed liquid stream in addition to an upwardly directed flow of molecular hydrogen for several reasons. For example, one may choose to introduce an upwardly directed liquid stream to the continuous liquid phase if the upwardly directed flow of molecular hydrogen alone does produce a desired degree slurry catalyst fluidization and/or if thermal regulation of the continuous liquid phase is needed by adding a liquid thereto.

In some embodiments, methods described herein may further comprise supplying an upwardly directed liquid stream into the continuous liquid phase. In some embodiments, the upwardly directed liquid stream may comprise a circulating liquid. In some embodiments, the circulating liquid may comprise the continuous liquid phase or any component thereof. In some embodiments, supplying an upwardly directed liquid stream into the continuous liquid phase may comprise circulating the continuous liquid phase through the cellulosic biomass solids in the continuous liquid phase in an upwardly directed manner. As used herein, the term "circulate" and variants thereof will be used to refer to the condition that exists when at least a portion of the continuous liquid phase is removed from the cellulosic biomass solids and is subsequently reintroduced one or more times thereto. Circulation of the continuous liquid phase is to be distinguished from conveyance of the continuous liquid phase to the continuous gas phase. In some embodiments, the circulating continuous liquid phase may contain the slurry catalyst therein, while in other embodiments, the slurry catalyst may be absent from the circulating continuous liquid phase. For example, in some embodiments, a slurry catalyst may be removed from the circulating continuous liquid phase and be returned separately to the cellulosic biomass solids or be added to the continuous liquid phase being conveyed to the continuous gas phase.

In some embodiments, at least a portion of the cellulosic biomass solids may reside on a porous retention structure that is configured to allow the upwardly directed flow of molecular hydrogen to pass therethrough. Suitable porous retention structures can include, for example, screens, grids, and like porous media. In various embodiments, the porous retention structure may reside within the continuous liquid phase. By maintaining at least a portion of the cellulosic biomass solids on the porous retention structure, better fluid through the cellulosic biomass solids may be realized. As cellulosic biomass solids are at least partially digested, they may lose structural integrity and attain a mush-like consistency that can block fluid flow pathways within the remainder of the cellulosic biomass solids. However, by maintaining the cellulosic biomass solids on a porous retention structure, at least a portion of the cellulosic biomass solids may accumulate below the porous retention structure in the continuous liquid phase. Specifically, as the cellulosic biomass solids attain a mush-like consistency through weakening of their structural integrity during hydrothermal digestion, they may be effectively extruded through the porous retention structure such that they do not significantly block flow pathways within the remainder of the cellulosic biomass solids. If the openings in the porous retention structure are comparable in size to the cellulosic biomass solids charged to the hydrothermal digestion unit, relatively undigested biomass will be retained on the structure, while biomass that has been partially digested will pass therethrough. Passage of the partially digested cellulosic biomass solids through the porous retention structure may be aided by weight of the cellulosic biomass solids above the porous retention structure and gas and/or liquid flow that break up the biomass into smaller particles that are not retained by the porous retention structure. By keeping the porous retention structure free of smaller particles, there may be a reduced likelihood of undesirably restricting flow in the hydrothermal digestion unit. In the foregoing concept, sometimes referred to as an "open screen" approach, cellulosic biomass solids collect on the porous retention structure in a sufficient quantity to form a filter cake that promotes retention of the remaining cellulosic biomass solids, regardless of particle size, until the filter cake particles are reduced in size and fall through and/or are extruded through the pores of the porous retention structure.

In some embodiments, the continuous liquid phase can be maintained with the extruded cellulosic biomass solids below the porous retention structure, and the continuous gas phase can be maintained with the cellulosic biomass solids above the porous retention structure. As discussed above, by maintaining the continuous liquid phase with at least the extruded cellulosic biomass solids, distribution of the slurry catalyst in the remainder of the cellulosic biomass solids can be facilitated. In some or other embodiments, the continuous liquid phase can also extend into the cellulosic biomass solids residing above the porous retention structure. In either case, the continuous liquid phase serves to float the cellulosic biomass particles at or above the screen, thereby reducing the effective weight of the biomass bed at the porous retention structure. Reducing the effective weight of the biomass bed by a buoyancy effect can desirably improve its permeability and decrease the likelihood of plugging in the hydrothermal digestion unit.

In some embodiments, a structured packing or support such as, for example, rings, saddles or like packing materials may be placed above the porous retention structure. Use of such packing materials may promote mixing of the cellulosic biomass solids with the slurry catalyst and molecular hydrogen, as liquid is passed downflow through the continuous gas phase.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst that is capable of activating molecular hydrogen may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. patent application Ser. No. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. patent application Ser. No. 12/407,479 (U.S. Patent Application Publication No. 20100236988), issued as U.S. Pat. No. 8,262,905 and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030,915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals.

In some embodiments, the alcoholic component formed from the cellulosic biomass solids may be further reformed into a biofuel. Reforming the alcoholic component into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent reforming reactions may be catalytic or non-catalytic. In some embodiments, an initial operation of downstream reforming may comprise a condensation reaction, often conducted in the presence of a condensation catalyst, in which the alcoholic component or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on the alcoholic component or a product derived therefrom. In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, ≥$C_4$ alcohols, ≥$C_4$ ketones, and mixtures thereof. The ≥$C_4$ alkanes and ≥$C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The ≥$C_4$ alkanes and ≥$C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various ≥$C_4$ alkanes and ≥$C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The ≥$C_5$ cycloalkanes and ≥$C_5$ cycloalkenes may have from 5 to about 30 carbon atoms and may be unsubstituted, mono-substituted or multi-substituted. In the case of mono-substituted and multi-substituted compounds, the substituted group may include a branched ≥$C_3$ alkyl, a straight chain ≥$C_1$ alkyl, a branched ≥$C_3$ alkylene, a straight chain ≥$C_1$ alkylene, a straight chain ≥$C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of ≥$C_5$ cycloalkanes and ≥$C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The ≥$C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropoly-acid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

Various operations may optionally be performed on the alcoholic component prior to conducting a condensation reaction. In addition, various operations may optionally be performed on the components of the continuous liquid phase that may further transform the alcoholic component or place the alcoholic component in a form more suitable for taking part in a condensation reaction. These optional operations are now described in more detail below.

After forming the alcoholic component from the cellulosic biomass solids, at least a portion of the continuous liquid phase may be separated therefrom and further processed by performing a condensation reaction on the alcoholic component in the aqueous phase, as described above. Processing of the alcoholic component in the aqueous phase may take place while simultaneously processing the light organics phase, or the light organics phase may be processed separately. The portion of the continuous liquid phase separated from the cellulosic biomass solids for purposes of processing the alcoholic component may comprise the aqueous phase alone, or a mixture of the aqueous phase with one or more of the other liquid phases comprising the continuous liquid phase (e.g., the phenolics liquid phase and/or the light organics phase).

Optionally, the continuous liquid phase separated from the cellulosic biomass solids may be subjected to a second catalytic reduction reaction, if needed, for example, to increase the amount of soluble carbohydrates that are converted into the alcoholic component and/or to further reduce the degree of oxygenation of the alcoholic components that are formed. For example, in some embodiments, a glycol or more highly oxygenated alcohol may be transformed into a monohydric alcohol by performing a second catalytic reduction reaction. The choice of whether to perform a condensation reaction on a monohydric alcohol or a glycol may be based on a number of factors, as discussed in more detail below, and each approach may present particular advantages.

In some embodiments, a glycol produced from the cellulosic biomass solids may be fed to the condensation catalyst. Although glycols may be prone to coking when used in conjunction with condensation catalysts, particularly zeolite catalysts, the present inventor found the degree of coking to be manageable in the production of higher molecular weight compounds. Approaches for producing glycols from cellulosic biomass solids and feeding the glycols to a condensation catalyst are described in commonly owned U.S. Patent Application 61/720,704, issued as U.S. Pat. No. 9,353,031, and incorporated herein by reference in its entirety. A primary advantage of feeding glycols to a condensation catalyst is that removal of water from glycols is considerably easier than from monohydric alcohols. Excessive water exposure can be particularly detrimental for zeolite catalysts and shorten their lifetime. Although monohydric alcohols are typically a preferred substrate for zeolite catalysts, they may be difficult to prepare in dried form due to azeotrope formation with water. Glycols, in contrast, are not believed to readily form binary azeotropes with water and may be produced in dried form by distillation.

In some embodiments, a dried alcoholic component, particularly a dried glycol, may be produced from cellulosic biomass solids and fed to a condensation catalyst. As used herein, the term "dried alcoholic component" refers to a liquid phase containing an alcohol that has had a least a portion of the water removed therefrom. Likewise, the terms "dried glycol" and "dried monohydric alcohol" respectively refer to a glycol or a monohydric alcohol that has had at least a portion of the water removed therefrom. It is to be recognized that a dried alcoholic component need not necessarily be completely anhydrous when dried, simply that its water content be reduced (e.g., less than 50 wt. % water). In some embodiments, the dried alcoholic component may comprise about 40 wt. % or less water. In some or other embodiments, the dried alcoholic component may comprise about 35 wt. % or less water, or about 30 wt. % or less water, or about 25 wt. % or less water, or about 20 wt. % or less water, or about 15 wt. % or less water, or about 10 wt. % or less water, or about 5 wt. % or less water. In some embodiments of the methods described herein, a substantially anhydrous alcoholic component may be produced upon drying. As used herein, a substance will be considered to be substantially anhydrous if it contains about 5 wt. % water or less.

In other embodiments, it may be more desirable to feed monohydric alcohols to the condensation catalyst due to a lower incidence of coking. As previously described, monohydric alcohols may be more difficult to produce in dried form due to azeotrope formation during distillation. In some embodiments, monohydric alcohols produced from cellulosic biomass solids may be fed directly to a condensation catalyst, without drying. In other embodiments, dried monohydric alcohols may be fed to a condensation catalyst. In some embodiments, dried monohydric alcohols may be produced from dried glycols. Specifically, dried glycols may be produced as described hereinabove, and the dried glycols may then be subjected to a catalytic reduction reaction to produce monohydric alcohols. The monohydric alcohols may contain a comparable amount of water to that present in the dried glycols from which they were formed. Thus, forming dried monohydric alcohols in the foregoing manner may desirably allow a reduced incidence of coking to be realized while maintaining lifetime of the condensation catalyst by providing a dried feed. The foregoing approach for producing dried monohydric alcohols from cellulosic biomass solids is described in commonly owned U.S. Patent Application 61/720,714, issued as U.S. Pat. No. 9,181,158, and incorporated herein by reference in its entirety.

In some embodiments, the phenolics liquid phase portion of the continuous liquid phase may be further processed. Processing of the phenolics liquid phase may facilitate the catalytic reduction reaction being performed to stabilize soluble carbohydrates. In addition, further processing of the phenolics liquid phase may be coupled with the production of dried glycols or dried monohydric alcohols for feeding to a condensation catalyst. Moreover, further processing of the phenolics liquid phase may produce methanol and phenolic compounds from degradation of the lignin present in the cellulosic biomass solids, thereby increasing the overall weight percentage of the cellulosic biomass solids that may be transformed into useful materials. Finally, further processing of the phenolics liquid phase may improve the lifetime of the slurry catalyst.

Various techniques for processing a phenolics liquid phase produced from cellulosic biomass solids are described in commonly owned U.S. Patent Applications 61/720,689, 61/720,747, 61/720,757, 61/720,765, and 61/720,774, issued as U.S. Pat. No. 9,284,242, published as US20140117277, published as US20140117276, published as US20140116425, and issued as U.S. Pat. No. 9,376,355, each incorporated herein by reference in its entirety. As described therein, in some embodiments, the viscosity of the phenolics liquid phase may be reduced in order to facilitate conveyance or handling of the phenolics liquid phase. As described therein, deviscosification of the phenolics liquid phase may take place by chemically hydrolyzing the lignin and/or heating the phenolics liquid phase in the presence of molecular hydrogen (i.e., hydrotreating) to depolymerize at least a portion of the lignin present therein in the presence of accumulated slurry catalyst. Deviscosification of the phenolics liquid phase may take place before or after separation of the phenolics liquid phase from one or more of the other phases present, and thermal deviscosification may be coupled to the reaction or series of reactions used to produce the alcoholic component from the cellulosic biomass solids. Moreover, after deviscosification of the phenolics liquid phase, the slurry catalyst may be removed therefrom. The catalyst may then be regenerated, returned to the cellulosic biomass solids, added to the continuous liquid phase being conveyed to the continuous gas phase, or any combination thereof.

In some embodiments, heating of the cellulosic biomass solids and the digestion solvent to form soluble carbohydrates and a phenolics liquid phase may take place while the cellulosic biomass solids are in a pressurized state. As used herein, the term "pressurized state" refers to a pressure that is greater than atmospheric pressure (1 bar). Heating a digestion solvent in a pressurized state may allow the normal boiling point of the digestion solvent to be exceeded, thereby allowing the rate of hydrothermal digestion to be increased relative to lower temperature digestion processes. In some embodiments, heating the cellulosic biomass solids and the digestion solvent may take place at a pressure of at least about 30 bar. In some embodiments, heating the cellulosic biomass solids and the digestion solvent may take place at a pressure of at least about 60 bar, or at a pressure of at least about 90 bar. In some embodiments, heating the cellulosic biomass solids and the digestion solvent may take place at a pressure ranging between about 30 bar and about 430 bar. In some embodiments, heating the cellulosic biomass solids and the digestion solvent may take place at a pressure ranging between about 50 bar and about 330 bar, or at a pressure ranging between about 70 bar and about 130 bar, or at a pressure ranging between about 30 bar and about 130 bar.

In some embodiments, systems configured for processing cellulosic biomass solids are described herein. The methods described hereinabove may be practiced with the illustrative biomass conversion systems described hereinafter. In various embodiments, the illustrative biomass conversions systems may be configured for maintaining a continuous liquid phase and a continuous gas phase in interfacial contact with one another within a hydrothermal digestion unit.

In some embodiments, biomass conversion systems can comprise: a hydrothermal digestion unit having a first zone and a second zone, the first zone being located below the second zone; wherein the first zone is configured to contain a continuous liquid phase and the second zone is configured to contain a continuous gas phase, and the continuous liquid phase contains a slurry catalyst therein; a fluid conduit external to the hydrothermal digestion unit configured to convey the continuous liquid phase from the first zone to the continuous gas phase in the second zone; and an inlet configured to provide upwardly directed gas flow in the first zone. In some embodiments, the upwardly directed gas flow in the first zone can comprise an upwardly directed flow of molecular hydrogen from the inlet.

In some embodiments, the biomass conversion systems may further comprise a porous retention structure within the first zone, the porous retention structure being configured to allow the upwardly directed gas flow to pass therethrough. Suitable porous retention structures and the benefits thereof have been previously described hereinabove. In some embodiments, the porous retention structure may be further configured to allow at least some cellulosic biomass solids to pass therethrough. For example, in some embodiments, the porous retention structure may be further configured to allow cellulosic biomass solids to be extruded therethrough as they are partially digested.

In some embodiments, the biomass conversion systems may further comprise a liquids removal line connected to the first zone, and a reactor housing a condensation catalyst in fluid communication with the liquids removal line. In some embodiments, the liquids removal line may be fluidly connected to the hydrothermal digestion unit at a second location, such that a continuous liquid phase in the first zone may be circulated therethrough. In some embodiments, the biomass conversion systems may further comprise a liquid phase separation unit in fluid communication with the liquids removal line, where the liquid phase separation unit is located between the hydrothermal digestion unit and the reactor housing the condensation catalyst. Further processing of the continuous liquid phase may take place in the liquid phase separation unit. Techniques for further processing the continuous liquid phase and the various phases thereof have been described in greater detail hereinabove.

In some embodiments, the hydrothermal digestion unit may be configured such that cellulosic biomass solids can be continuously or semi-continuously fed thereto, thereby allowing hydrothermal digestion to take place in a continual manner. That is, the hydrothermal digestion unit of the biomass conversion systems may be configured such that fresh cellulosic biomass solids may be added to the hydrothermal digestion unit on an ongoing basis or an as-needed basis in order to replenish cellulosic biomass solids that have been digested to form soluble carbohydrates. In some embodiments, the cellulosic biomass solids may be continuously or semi-continuously added to the hydrothermal digestion unit while the hydrothermal digestion unit is in a pressurized state. In some embodiments, the pressurized state may comprise a pressure of at least about 30 bar. Without the ability to introduce fresh cellulosic biomass solids to a pressurized hydrothermal digestion unit, depressurization and cooling of the hydrothermal digestion unit may take place during biomass addition, significantly reducing the energy- and cost-efficiency of the biomass conversion process. As used herein, the term "continuous addition" and grammatical equivalents thereof will refer to a process in which cellulosic biomass solids are added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of cellulosic biomass solids to a hydrothermal digestion unit without fully depressurizing the hydrothermal digestion unit. Techniques through which cellulosic biomass solids may be added continuously or semi-continuously to a pressurized hydrothermal digestion unit are discussed in more detail hereinbelow.

In some embodiments, cellulosic biomass solids being continuously or semi-continuously added to the hydrothermal digestion unit may be pressurized before being added to the hydrothermal digestion unit, particularly when the hydrothermal digestion unit is in a pressurized state. Pressurization of the cellulosic biomass solids from atmospheric pressure to a pressurized state may take place in one or more pressurization zones before addition of the cellulosic biomass solids to the hydrothermal digestion unit. Suitable pressurization zones that may be used for pressurizing and introducing cellulosic biomass solids to a pressurized hydrothermal digestion unit are described in more detail in commonly owned U.S. patent application Ser. Nos. 13/332,322 and 13/332,329, issued as U.S. Pat. No. 8,945,243 and U.S. Pat. No. 9,175,227, respectively, and each incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner.

The methods and biomass conversion systems set forth herein will now be described with further reference to the drawings. When like elements are used in one or more figures, identical reference characters will be used in each figure, and a detailed description of the element will be provided only at its first occurrence.

Figure 2:
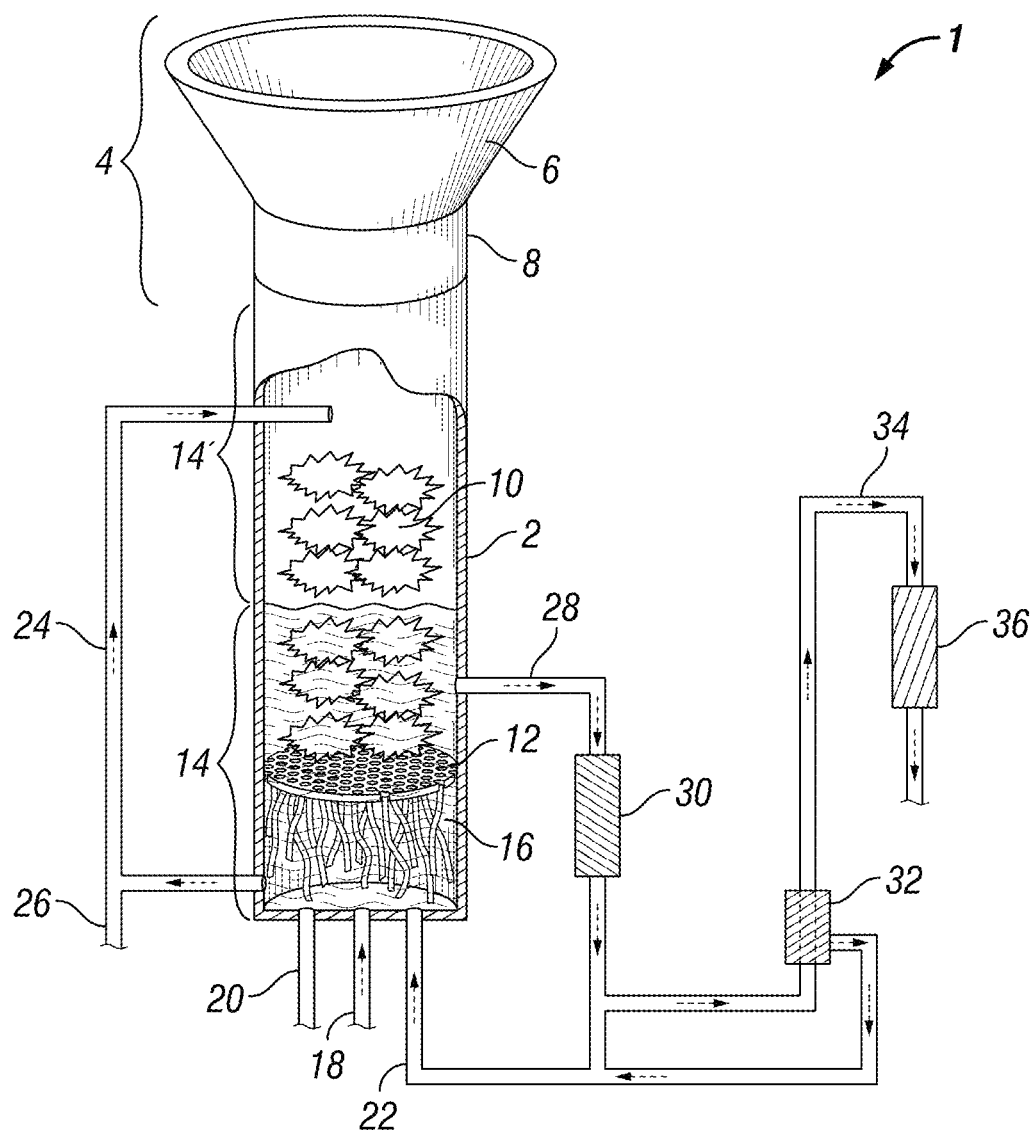

FIGS. 1 and 2 show schematics of an illustrative biomass conversion system 1 in which cellulosic biomass solids may be digested in the presence of a continuous liquid phase and a continuous gas phase that are interfacial to one another. As depicted in the FIGURES, cellulosic biomass solids 10 may be introduced to hydrothermal digestion unit 2 via solids introduction mechanism 4. Solids introduction mechanism 4 may comprise loading mechanism 6 and pressure transition zone 8, which may elevate the cellulosic biomass solids from atmospheric pressure to a pressure near that of the operating pressure of hydrothermal digestion unit 2, thereby allowing continuous or semi-continuous introduction of cellulosic biomass solids to take place without fully depressurizing hydrothermal digestion unit 2. Suitable loading mechanisms and pressure transition zones have been described in more detail hereinabove.

Once introduced to hydrothermal digestion unit 2, cellulosic biomass solids 10 rest on porous retention structure 12. Within hydrothermal digestion unit 2, there is a continuous liquid phase within zone 14 and a continuous gas phase within zone 14'. As depicted in FIG. 1, the continuous liquid phase resides below porous retention structure 12, and the continuous gas phase resides above. However, as shown in FIG. 2, the continuous liquid phase may extend above porous retention structure 12 as well. Weakened cellulosic biomass solids may pass through porous retention structure 12 as a biomass extrudate 16, which remains in the continuous liquid phase. Although FIGS. 1 and 2 have depicted biomass extrudate 16 in elongated strand form, the weakened cellulosic biomass solids may also break apart into finely divided particulates as they pass through porous retention structure 12, before undergoing further digestion.

Cellulosic biomass solids 10 may have a slurry catalyst distributed therein while in hydrothermal digestion unit 2. In the interest of clarity, particulates of the slurry catalyst have not been depicted in the FIGURES.

An upwardly directed flow of molecular hydrogen may be supplied to hydrothermal digestion unit 2 via inlet 18. Inlet 18 may be connected to a flow dispersal system (not shown) within hydrothermal digestion unit 2 that results in formation of hydrogen gas bubbles within the continuous liquid phase. As the bubbles rise within zone 14 they may undergo coalescence and eventually exit the continuous liquid phase to form the continuous gas phase in zone 14'.

In addition to the upwardly directed flow of molecular hydrogen, an upwardly directed liquid stream may optionally be supplied to hydrothermal digestion unit 2 by inlet 20. The liquid phase supplied by inlet 20 may replace the portion of the continuous liquid phase that is removed for downstream processing, as discussed in more detail hereinafter. Optionally, additional slurry catalyst particulates may be supplied via inlet 20 as well, if desired. Another upwardly directed liquid stream may be provided to hydrothermal digestion unit 2 by recycle line 22, in which the continuous liquid phase, and optionally slurry catalyst particulates therein, may be removed from hydrothermal digestion unit 2 via line 28 and recirculated thereto. Further discussion regarding recirculation of the continuous liquid phase is provided below.

In order to provide effective slurry catalyst distribution in the continuous gas phase, a portion of the continuous liquid phase can be removed from zone 14 and conveyed by line 24 to zone 14'. Once returned to hydrothermal digestion unit 2, the continuous liquid phase and slurry catalyst may contact the cellulosic biomass solids in the continuous gas phase in zone 14' and migrate downward therethrough. The slurry catalyst particulates being conveyed to the continuous gas phase in zone 14' may be those previously located in the continuous liquid phase in zone 14. Optionally, the slurry catalyst particulates being conveyed to the continuous gas phase in zone 14' may be regenerated, if needed, prior to or while being conveyed to the continuous gas phase. Further optionally, if insufficient slurry catalyst particulates are present, additional slurry catalyst particulates may be supplied via inlet 26 to the continuous liquid phase being conveyed in line 24.

A portion of the continuous liquid phase may exit hydrothermal digestion unit 2 via line 28. The continuous liquid phase may be recirculated to hydrothermal digestion unit 2 via recycle line 22, as described above, or it may undergo further processing thereafter, as described in further detail hereinbelow. Optionally, polishing reactor 30 may be in fluid communication with line 28. Polishing reactor 30 may contain a catalyst capable of activating molecular hydrogen such that soluble carbohydrates in the continuous liquid phase may be further converted into an alcoholic component or the degree of oxygenation of the alcoholic component may be further decreased. For example, in some embodiments, a glycol may be converted into a monohydric alcohol in polishing reactor 30. The catalyst present in polishing reactor 30 may be the same or different than the slurry catalyst.

The continuous liquid phase in line 28 may be conveyed to separations unit 32, where various operations may take place. In some embodiments, at least a portion of any water present in the continuous liquid phase may be removed in separations unit 32 before subsequent downstream processing. In some embodiments, a phenolics liquid phase comprising at least a portion of the continuous liquid phase may be separated from the continuous liquid phase for further processing, or the viscosity of the phenolics liquid phase may be reduced, as described above. In some embodiments, the alcoholic component present in the continuous liquid phase may be at least partially separated therefrom in separations unit 32. Optionally, at least a portion of the separated alcoholic component may be recycled to hydrothermal digestion unit 2 via recycle line 22, if desired.

The alcoholic component exiting separations unit 32 may be conveyed to reforming reactor 36 via line 34. Optionally, reaction products arising from lignin depolymerization (e.g., phenolic compounds) may also be conveyed to reforming reactor 36 along with the alcoholic component and/or methanol for further processing. In reforming reactor 36, a condensation reaction or other reforming reaction may take place. The reforming reaction taking place therein may be catalytic or non-catalytic. Although only one reforming reactor 36 has been depicted in FIGS. 1 and 2, it is to be understood that any number of reforming reactors may be present. In reforming reactor 36, one or more further reforming reactions may take place, as described above. In some embodiments, a first reforming reaction may comprise a condensation reaction. Additional reforming reactions may comprise any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such transformations may be used to convert the initially produced soluble carbohydrates into a biofuel. Such biofuels may include, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of 32° C. to about 204° C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point ranging between about 187° C. and about 417° C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655. In some embodiments, jet fuels may comprise a kerosene-type fuel having substantially $C_8$-$C_{16}$ hydrocarbons (Jet A and Jet A-1 fuels). In other embodiments, jet fuels may comprise a wide-cut or naphtha-type fuel having substantially $C_5$-$C_{15}$ hydrocarbons present therein (Jet B fuels).

To facilitate a better understanding of the present invention, the following examples of preferred embodiments are given. In no way should the following examples be read to limit, or to define, the scope of the invention.

EXAMPLES

In the Examples that follow, gas chromatography was conducted using a 60 m×0.32 mm ID DB-5 column of 1 µm thickness, with 50:1 split ratio, 2 mL/min helium flow, and column oven held at 40° C. for 8 minutes, followed by ramp to 285° C. at 10° C./min, and a hold time of 53.5 minutes. The injector temperature was set at 250° C., and the detector temperature was set at 300° C. A range of alkanes, monooxygenated aldehydes and ketones, glycols, and polyols were observed in the aqueous phase, each with a volatility greater than the $C_6$ sugar alcohol sorbitol. Ethylene glycol, 1,2-propylene glycol, and glycerol were all observed. No peaks having a volatility greater than sorbitol were detected.

Examples 1A-1C

Simulated Trickle Bed Hydrothermal Digestion 75 mL Parr5000 reactors were charged with 8.0 grams of southern pine mini-chips (39% moisture) having nominal dimensions of 3 mm×4 mm×5 mm 0.60 grams of slurry catalyst and 0.25 grams of potassium carbonate buffer were slurried with 12 grams of digestion solvent. The slurry catalyst was a sulfided nickel oxide promoted cobalt molybdate catalyst (DC-2534, Criterion Catalyst & Technologies L.P., containing 1-10% cobalt oxide and molybdenum trioxide (up to 30 wt %) on alumina, and less than 2% nickel), which was previously sulfided as described in United States Patent Application Publication 2010/0236988, incorporated herein by reference in its entirety. The slurry catalyst was crushed to less than 10 microns in size before being mixed with the digestion solvent. Thereafter, the solvent mixture was added dropwise over the wood chip bed to simulate trickle bed contacting of the digestion solvent with the wood chips. For Examples 1A-1C, the digestion solvents were respectively 1-octanol, o-cresol, and water.

The reactors were then pressurized with 52 bar of hydrogen and heated with stirring to 190° C. for 1 hour, followed by heating to 240° C. for 3 hours and to 270° C. for 2 hours. The reactors were then cooled and depressurized, and the reactor contents were vacuum filtered using Whatman GF/F filter paper to determine the amount of undigested wood chips. For Example 1A, 83% digestion of the wood chips occurred. For Example 1B, 96% digestion of the wood chips occurred. For Example 1C, only 66% digestion of the wood chips occurred. Thus, hydrothermal digestion was able to be conducted by contacting wood chips with a continuous liquid phase containing a slurry catalyst and a continuous gas phase containing molecular hydrogen.

Example 2

Simulated Trickle Bed Hydrothermal Digestion and Subsequent Liquid Phase Digestion A 100 mL Parr reactor was charged with 44.1 grams of southern pine mini-chips (39% moisture) having nominal dimensions of 3 mm×4 mm×5 mm 1.81 grams of sulfided cobalt molybdate slurry catalyst, described above, and 0.348 grams of potassium carbonate buffer were slurried with 20.81 grams of o-cresol digestion solvent. Thereafter, the solvent mixture was added dropwise over the wood chip bed to simulate trickle bed contacting of the digestion solvent with the wood chips.

The reactors were then pressurized with 52 bar of hydrogen and heated unstirred to 190° C. for 1 hour, followed by heating to 210° C. for 4 hours and to 240° C. for 2 hours. At the end of this cycle, greater than 90% of the wood chips were dissolved into a formed liquid phase. The reactor contents were then transferred to a 100 mL Parr reactor fitted with a stirring impeller, and a further 0.19 grams of potassium carbonate buffer and 8.08 grams of wood chips were added. The reactor was then pressurized with 54 bar of hydrogen and heated to 190° C. for 1 hour, followed by heating at 250° C. for 4 hours. Conversion of the intermediates occurred in the liquid phase, with hydrogen gas being introduced and dispersed thereinto by stirred agitation at 850 rpm with the impeller. A 7.18 gram sample of the reaction product was removed via a dip tube fitted with a 0.5 micron sintered metal filter. After gravity settling, an upper aqueous phase comprised 62% of the sample, and a phenolics-rich lower phase comprised 38% of the sample. The aqueous phase contained, among other components, methanol, ethanol, 1-propanol, ethylene glycol, 1,2-propylene glycol, and acetic acid. The lower phenolics-rich phase contained a myriad of components of volatility greater than sorbitol, including species such as propyl phenols. Analysis of the gas phase indicated the formation of carbon dioxide, methane, and $C_2$-$C_4$ hydrocarbons at a carbon yield of less than 10% of the amount of wood charge. The overall yield of intermediates having a volatility greater than sorbitol was estimated at 42%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
    providing a first portion of cellulosic biomass solids being contacted by a continuous liquid phase and a second portion of cellulosic biomass solids being contacted by a continuous gas phase, wherein the continuous liquid phase and the continuous gas phase interfacially contacting one another in a hydrothermal digestion unit;

wherein a slurry catalyst capable of activating molecular hydrogen is present in the continuous liquid phase;

supplying an upwardly directed flow of molecular hydrogen through the cellulosic biomass solids;

heating the cellulosic biomass solids and the continuous liquid phase in the presence of the molecular hydrogen, thereby forming an alcoholic component derived from the cellulosic biomass solids;

conveying at least a portion of the continuous liquid phase and at least a portion of the slurry catalyst to a location in said hydrothermal digestion unit that is within the continuous gas phase that is above at least a portion of the cellulosic biomass solids; and after said conveying the continuous liquid phase and the slurry catalyst, releasing them such that they contact the second portion of cellulosic biomass solids in the continuous gas phase in said hydrothermal digestion unit.

2. The method of claim 1, wherein, once released, the continuous liquid phase and the slurry catalyst migrate downward through the second portion of cellulosic biomass solids as a discontinuous phase within the continuous gas phase.

3. The method of claim 1, further comprising:
adding slurry catalyst to the portion of the continuous liquid phase being conveyed to the location within the continuous gas phase.

4. The method of claim 1, wherein at least a portion of the slurry catalyst in the continuous liquid phase is upwardly conveyed into at least a portion of the first portion of cellulosic biomass solids by the upwardly directed flow of molecular hydrogen.

5. The method of claim 1, further comprising:
supplying an upwardly directed liquid stream into the continuous liquid phase.

6. The method of claim 1, wherein at least a portion of the cellulosic biomass solids reside on a porous retention structure that is configured to allow the upwardly directed flow of molecular hydrogen to pass therethrough.

7. The method of claim 1, wherein, after being released, at least a portion of the continuous liquid phase and the slurry catalyst adheres to the cellulosic biomass solids.

8. The method of claim 1, wherein the first portion of cellulosic biomass solids and the second portion of cellulosic biomass solids are located in a hydrothermal digestion unit, the hydrothermal digestion unit comprising a fluid conduit external thereto that is configured to convey the continuous liquid phase from a lower portion of the hydrothermal digestion unit to an upper portion of the hydrothermal digestion, where the continuous gas phase is located.

9. A method comprising:
providing cellulosic biomass solids in a hydrothermal digestion unit, a first portion of the cellulosic biomass solids being contacted by a continuous liquid phase and a second portion of the cellulosic biomass solids being contacted by a continuous gas phase in said hydrothermal digestion unit;

wherein a slurry catalyst capable of activating molecular hydrogen is present in the continuous liquid phase;

supplying an upwardly directed flow of molecular hydrogen through the cellulosic biomass solids;

heating the cellulosic biomass solids and the continuous liquid phase in the presence of the molecular hydrogen, thereby forming an alcoholic component derived from the cellulosic biomass solids;

conveying at least a portion of the continuous liquid phase and at least a portion of the slurry catalyst through a fluid conduit external to the hydrothermal digestion unit to a location in said hydrothermal digestion unit that is within the continuous gas phase that is above at least a portion of the cellulosic biomass solids; and after said conveying the continuous liquid phase and the slurry catalyst, releasing them such that they migrate downward through the second portion of cellulosic biomass solids as a discontinuous phase within the continuous gas phase in said hydrothermal digestion unit.

10. The method of claim 9, wherein the continuous liquid phase comprises one or more liquid phases.

11. The method of claim 10, wherein the one or more liquid phases comprises a phenolics liquid phase comprising lignin or a product formed therefrom, an aqueous phase comprising the alcoholic component, a light organics phase, or any combination thereof.

12. The method of claim 9, further comprising:
supplying an upwardly directed liquid stream into the continuous liquid phase.

13. The method of claim 12, wherein supplying an upwardly directed liquid stream into the continuous liquid phase comprises circulating the continuous liquid phase through the first portion of cellulosic biomass solids in an upwardly directed manner.

14. The method of claim 9, wherein at least a portion of the cellulosic biomass solids reside on a porous retention structure within the hydrothermal digestion unit, the porous retention structure being configured to allow the upwardly directed flow of molecular hydrogen to pass therethrough.

15. The method of claim 14, wherein at least a portion of the cellulosic biomass solids accumulate below the porous retention structure in the continuous liquid phase.

16. The method of claim 9, wherein the slurry catalyst comprises a poison-tolerant catalyst.

* * * * *